United States Patent [19]

Proksch et al.

[11] Patent Number: 4,498,646
[45] Date of Patent: Feb. 12, 1985

[54] WING FOR SHORT TAKE-OFF AND LANDING AIRCRAFT

[75] Inventors: Hans-Jörg Proksch, Hagnau; Dieter Welte, Markdorf; Herbert Zimmer, Friedrichshafen; Michael Lotz, deceased, late of Immenstaad, all of Fed. Rep. of Germany, by Carla Lotz, née Post, Andreas Lotz, heirs

[73] Assignee: Dornier GmbH, Friedrichshafen, Fed. Rep. of Germany

[21] Appl. No.: 356,418

[22] Filed: Mar. 9, 1982

[30] Foreign Application Priority Data

Jul. 1, 1981 [DE] Fed. Rep. of Germany ....... 3125916

[51] Int. Cl.³ .............................................. B64C 3/26
[52] U.S. Cl. .................. 244/35 R; 244/216; 416/223 R
[58] Field of Search .............. 244/34, 35, 216, 123; 416/223 R

[56] References Cited

U.S. PATENT DOCUMENTS

| | | | |
|---|---|---|---|
| 3,576,301 | 4/1971 | Stickle | 244/216 |
| 4,121,787 | 10/1978 | Wilby | 244/35 R |
| 4,413,796 | 11/1983 | Bousquet | 244/35 R |

FOREIGN PATENT DOCUMENTS 8102557 9/1981 United Kingdom ................ 244/123

Primary Examiner—Galen L. Barefoot
Attorney, Agent, or Firm—Ralf H. Siegemund

[57] ABSTRACT

Profile design for aircraft lift-wings in general aviation up to flight speeds of about 700 km/h, the profile design being determined by the path of the center line with a forward (first) and rear (second) camber maximum and with a profile droplet superposed on the center line and of a specific thickness distribution, and by the design of the profile nose to have a relatively small nose radius and relatively strong camber.

2 Claims, 8 Drawing Figures

WING FOR SHORT TAKE-OFF AND LANDING AIRCRAFT

This invention relates to the cross-sectional profile of lifting airfoils of short take-off and landing aircraft with cruising speeds up to about 700 km/h.

Aircraft of the cited kind are required to provide improved economy at high performance in view of the present energy situation and the likely future one. The design of the cross-sectional profile of the wings assumes substantial significance in meeting high performance requirements.

It was conventional practice in the past to select cross-sectional wing profiles for general aviation out of catalogs of such profiles. Such catalogs contain listings of series of profiles such as have been compiled for instance by NACA. A specific system has been set up for compiling a series of profiles, whereby definite variational characteristics can be inferred.

For instance, the compliation of a series of profiles of one system contains data regarding the percentage profile camber, the camber offset to the rear in tenths of the profile depth, and the profile thickness as a percentage of the profile depth.

For another series of profiles, the fixed values of the profile camber are accompanied by the double value of the rear-offset camber in tenths of the profile depth, the shape of the center line and the values for profile design - as regards the profile thickness - as a percentage of the profile depth.

The more recent trend, also regarding later NACA developments, starts from pure aerodynamics based on predetermined pressure of speed distributions on the suction and pressure sides of the profiles. The purpose of the stated developments is to obtain profile designs that will optimally solve given problems.

Comparisons of the performance requirements placed on profiles, in terms of energy consumption, with the performances of previously known profile designs indicate that optimization demands an increase in the maximum lift of the profiles with or without the use of high-lift means in the form of flaps.

Preferably flap systems with only one slot should be used to prevent higher weight and to reduce drag.

The maximum lift of extant profile series of laminar profiles is relatively low on account of the need of keeping the nose radius fairly small to retain laminar flow. On the other hand, the least drag of the laminar profiles using laminar dents is very low.

The present invention is not based on laminar profiles for the reason that there are inevitable manufacturing irregularities in the upper and lower sides of the profile across the profile depth, for instance in the area of the junction of the nose box to the forward spar (for instance for a design in the vicinity of 17 percent of the profile depth), and because at least one segment of the free upper wing side is in the stream of the propeller or propellant gas jets of the engines.

Based on the above factors, provision was made to create profiles which are improved over the known ones (for instance from the NACA catalogs) as regards the maximum lift and the gliding angle resulting from the ratio of drag to lift, further as regards a more pronounced camber of the profile nose and a more pronounced camber of the profile in the rear segment of the profile upper side.

Such known designs evince certain similarities to known wing profiles for supercritical flow conditions. However, as regards these known profile designs, the strong rearward loads on the profile cause a pitching moment with nose-heaviness compared to conventional profiles. The profile nose is thicker in this instance and causes a decrease in peak suction in the area of the profile nose, while the segment at the rear which comprises more of a camber than conventional profiles causes the increased load in the rear profile section.

Such a nose-heavy pitching moment in aircraft of the initially cited kind adversely results in a trimming drag which is several percent of the cruising drag.

It is the object of the present invention to provide profiles for the wings of aircraft of the kind cited, which on one hand will offer a maximum lift higher than conventional and on the other hand allow a reduction of the nose-heavy pitching moment. It is moreover the object of the invention to provide a favorable transition - in the case of high-lift flaps - from the contour of the wing to the contour of the flaps, both in the extended and the retracted positions, in order to achieve optimal flow conditions.

The invention accomplishes its object in that the profile evinces a center line so related to the nose radius as to achieve the greatest possible lift and the least possible trimming drag for take-off or cruising, the center line (S) including a forward point ($b_1$) at about $x/l=0.15$ with a first camber maximum of about 1.54% of the length (l), a rear point ($b_2$) at about $x/l=0.7$ with a second camber maximum of about 1.94% of the length (l), a point ($b_3$) between the two points ($b_1$ and $b_2$) at about $x/l=0.4$ with a camber mainimum of about 1.4% of the length (l), a profile droplet being superposed on the center line with a thickness distribution D having forward point $y_D/l$ of about 0.059 at about $x/l=0.15$, a point of about $y_D/l=0.08$ at about $x/l=0.42$, a point of about $y_D/l=0.052$ at $x/l=0.7$ approximately, and a rear point of about $y_D/l=0.007$ at about $x/l=1.0$, the profile furthermore being designed with a nose radius (r) of about $r/l=0.0145$.

Wing profiles so designed evince a substantially higher maximum lift when compared to known wing profiles of comparable aircraft, both with and without such high-lift means as single-slot flaps, whereby it becomes possible to improve the landing properties with respect to the shortest possible landing path.

Furthermore, the profile design results in a reduction of the pitching moment whereby the trimming drag is decreased and hence a substantial saving in fuel is obtained. Also, the design of the profile of the invention results in an improvement in the lift-drag ratio at take-off.

For instance, the profile design for a twin engine travel aircraft with a take-off weight of 1814 kp, a wing load of 94.5 kp/m² and an engine output of 2×200 hp provides an increase of 20 percent in the maximum lift and an increase in take-off lift-drag ratio of 4 percent, while the take-off roll is decreased by 25 percent and the climb gradient at engine failure is increased by 32 percent.

A further development of the invention provides for a high-lift flap on the wing in the manner of a single slot flap and that the flap can be of a depth of about 30 percent of the depth of the wing profile, the maximum rear offset of the flap roof being of the order of 90 percent.

When the slotted flap of the invention is in the landing position, a high maximum lift is achieved, for instance for one design, $c_{amax}=3.4$, and a relatively high lift-drag ratio within climbing flight of the order of $1.8 \leq c_a \leq 2.2$ is achieved for take-off. Due to profiling the flap to correspond to the wing profile with a relatively small nose radius of relatively strong camber, a pressure distribution is achieved which is similar to that at the wing and includes the same advantages cited with respect to the same.

The cambering of the flap roof and of the slot flap results in a marked pressure drop in the area of the flap roof and in ample loading of the flap as a whole. For a relatively small flap extension, the flap profile provides a relatively high maximum lift. This results in an extraordinarily high lift-drag ratio.

One embodiment of the profile of the invention is shown in the accompanying drawings in which:

FIG. 1 shows an embodiment of a wing profile in a coordinate system where the relative profile depth x/l is plotted for the profile chord length l on the abscissa x and the relative profile thickness y/l, divided into tenths of the profile depth or profile thickness, is plotted on the ordinate y.

Figure 1:
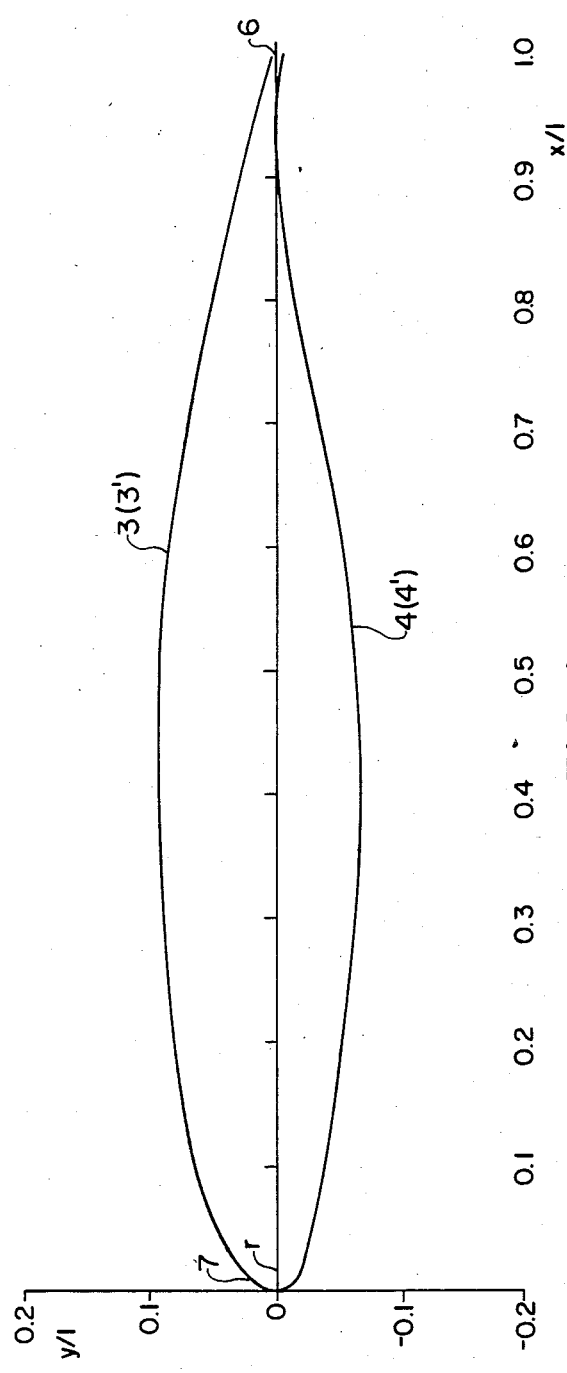
FIG. 1 is a schematic profile of a wing shown two-dimensionally in the x and y directions.
Figure 2:
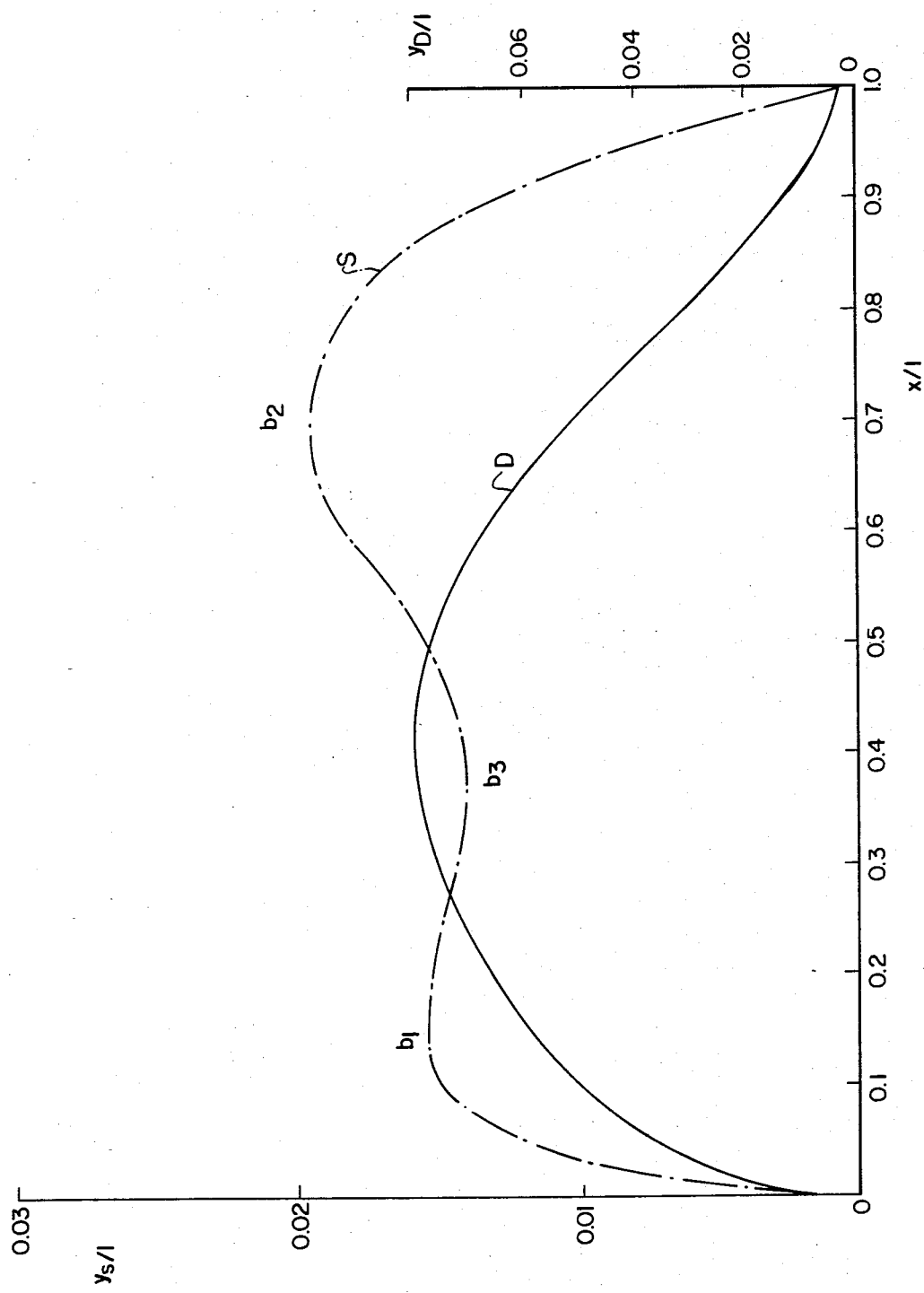
FIG. 2 is a graph of the camber of the profile center line and the thickness of the profile droplet superposed on the center line, another scale applying to the thickness.

The profile contour in FIG. 1 is determined by the predetermined profile droplet of FIG. 2 which is superposed in known manner to the cambered center line S of FIG. 2 with its two camber maxima $b_1$ and $b_2$ and the camber minimum $b_3$ located between the maxima.

The camber of the characteristic center line S of FIG. 2 evinces a rear segment x/l of 0.7 with the second camber maximum $b_2$ with a marked drop toward the profile trailing edge 6, which jointly with the relatively thick trailing edge of $y_D/l=0.007$ of FIG. 2 results in the commonly called "rear loading" effect of the pressure on the profile upper side 3 and the profile lower side 4.

The center segment x/l from the graduation 0.3 to 0.7 of the characteristic line with a drop in camber and including the camber minimum $b_3$ in conjunction with the thickness distribution D of FIG. 2 results in a flat profile upper side 3 avoiding the premature detachment of the boundary layer, and in a low pressure area at the upper profile side 3 which is extensively effective in the rear toward the profile trailing edge 6.

The forward segment x/l starting from 0 and up to about 0.25 of the graduation is formed by the relatively small nose radius r and the relatively large camber and by the downwardly drawn profile nose 7 for achieving the commonly called "front loading" pressure effect on the profile upper side 3 and the profile lower side 4. This provides the required favorable trimming drags while cruising with the partial compensation of the pitching moment due to the "rear loading" in the rear of the profile.

As shown by FIG. 2, the profile contour is determined by the camber of the center line S and by a symmetric thickness distribution D superposed on the center line S. An ordinate y with another scale is plotted opposite the center line determination.

The selected thickness distribution D however has a forward point of $y_D/l=0.059$ at about $x/l=0.15$, a point of about $y_D/l=0.08$ at about $x/l=0.42$, and a rear point of about $y_D/l=0.007$ at about $x/l=1$. A nose radius of $r/l=0.0145$ is determined for the profile nose design.

Figure 3:
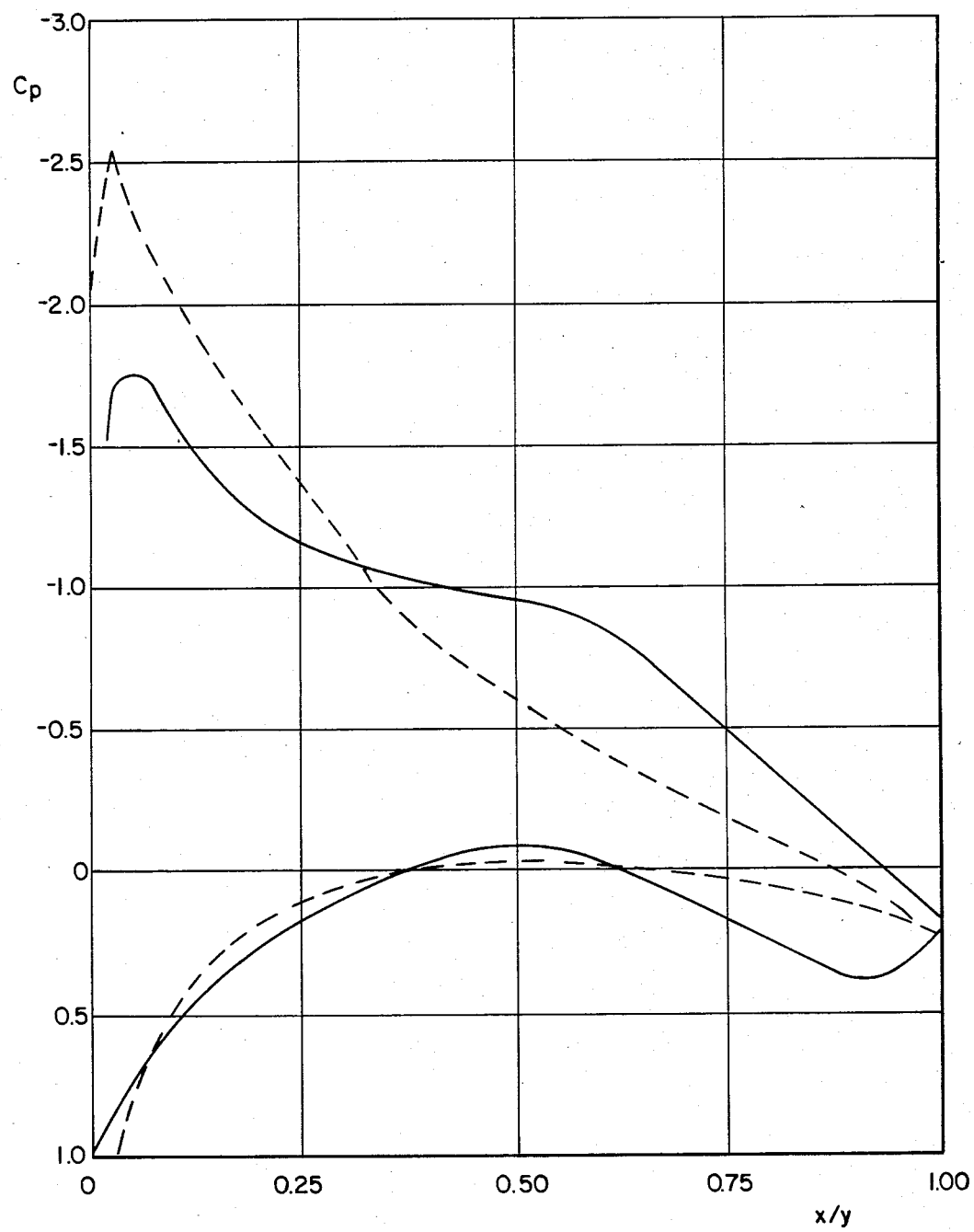
FIG. 3 is a graph of the characteristic pressure distribution at the wing profile compared with a conventional wing profile.

The graph of FIG. 3 shows the pressure distribution compared to a conventional profile design in relation to the design of the profile of FIGS. 1 and 2. The advantageous pressure distribution that can be achieved by the design of FIGS. 1 through 3 with the decrease of the suction peak and the ensuing good properties for slow flight without the danger of boundary layer separation at greater angles of attack can be recognized. The characteristic line, shown dashed, corresponds to the conventional design.

Figure 4:
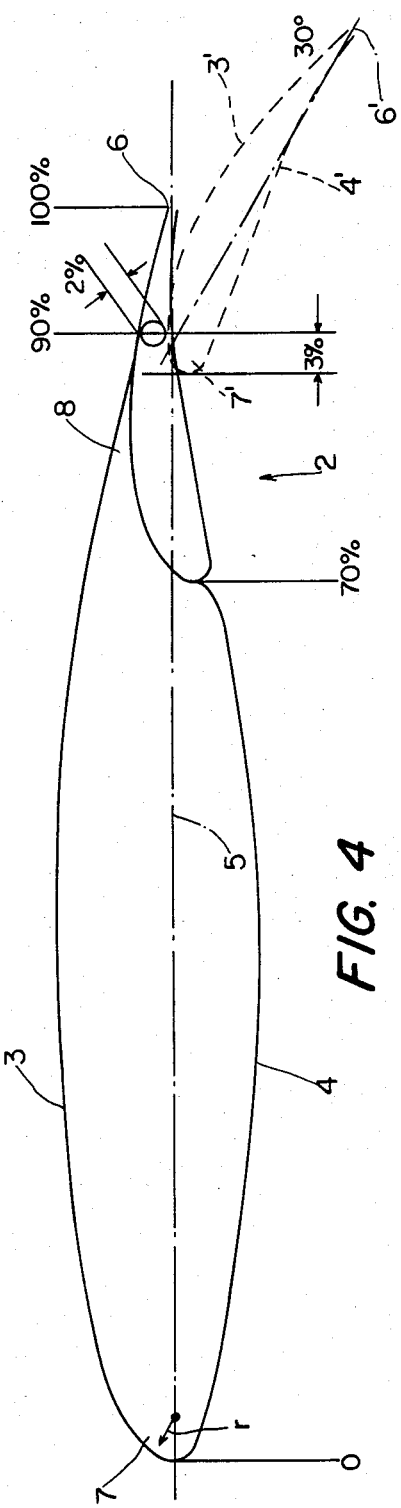
FIG. 4 is a schematic showing of the wing profile in conjunction with the slot-flap profile.

This effect is achieved due to the relatively small nose radius and the rise in the camber of the center line S to the first camber maximum $b_1$. The diagram moreover indicates the "front-loading" effect achieved in connection with the possible "rear-loading" effect, FIG. 4 showing an advantageous transition to the upper side of a high lift flap. Also, the pressure curve $c_p$ in the region x/l between 0.25 and about 0.6 is nearly planar, corresponding to the minimum $b_3$ of the center line S.

Figure 5:
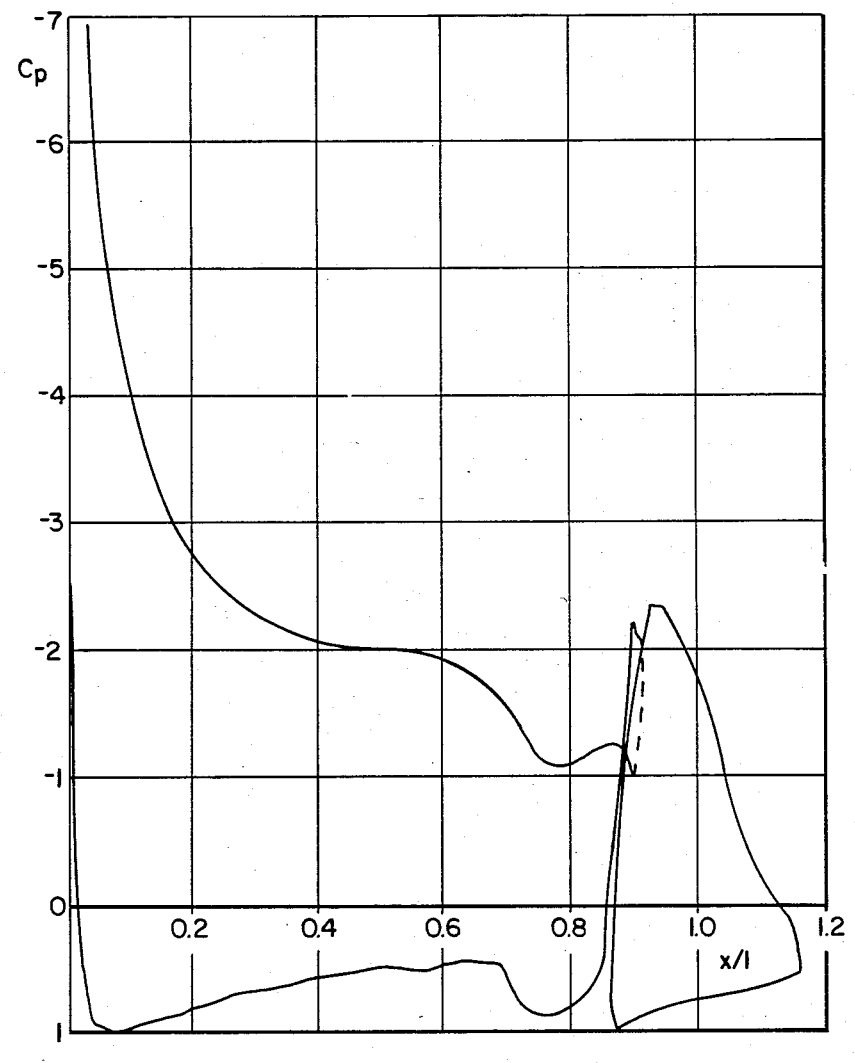
FIG. 5 is a graph of the pressure distribution characteristic of the wing for an extended slot-flap.

FIG. 4 shows the profile design in conjunction with a single slot flap 2. The diagram of the characteristic pressure distribution of FIG. 5 at the profile of the slot flap 2 evinces a pressure distribution similar to that of the profile, thereby obtaining the already cited advantageous effects. The flap upper and lower sides are denoted by 3' and 4' respectively, and the flap nose is denoted by 7'.

Figure 6B:
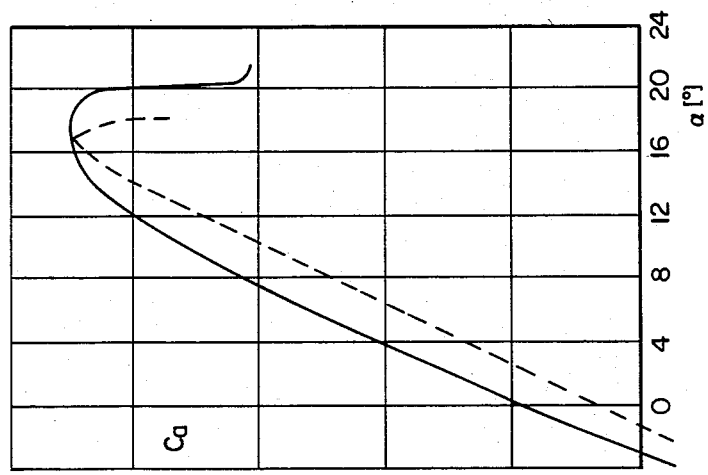
FIG. 6b is a graph of the lift characteristic as a function of the angle of attack compared with a conventional profile.
Figure 6A:
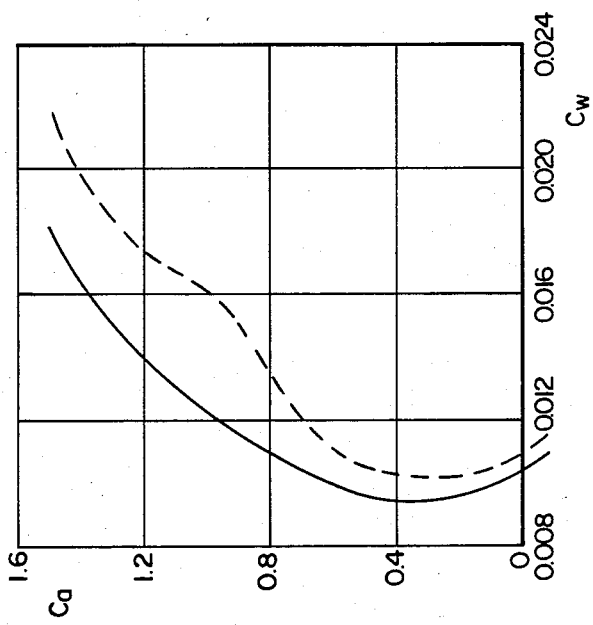
FIG. 6a is a graph of the lift characteristic as a function of drap compared with a conventional wing profile.

FIG. 6a graphically shows the improved polar curves for the designs of the wing profile or the lift and drag coefficients of the profile, $c_a$ or $c_w$, compared with a corresponding conventional profile, in this instance the NACA profile 23,018 shown in dashed lines.

FIG. 6b shows the lift coefficient $c_a$ plotted against the angle of attack α of the embodiment, also in comparison with the values of the known profile (NACA 23,018). It will be noted that the maximum lift $c_{amax}$ remains constant over a large range of variation in the angle of attack α, so that corresponding to the object of the invention there is insensitivity in the profile design in slow flight.

Figure 7:
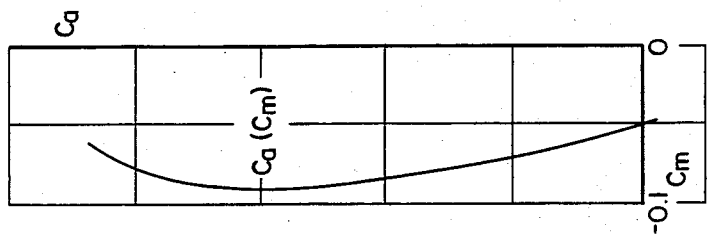
FIG. 7 is a graph of the characteristic pitching moment.

Lastly, FIG. 7 shows the pitching moment $c_m$ at a lesser value over the entire lift range and with the resulting good trimming properties and the ensuing drag reduction for the cruising of the aircraft.

It was found that the cooperation of the mutually related features of the profile of the invention results in a substantial improvement in the maximum lift, in the lift-drag ratio and trimming, and in thereby reducing drag while cruising and hence in a substantial saving in fuel while solving the object requirements of the invention.

SYMBOLS $c_w$: drag coefficient
$r$: nose radius
$c_p$: pressure coefficient
$c_a$: lift coefficient
$c_m$: pitching moment coefficient
$x/l$: relative profile depth
$y/l$: relative profile thickness
$x$: abscissa
$y$: ordinate
$y_D/l$: relative profile thickness (profile droplet)
$l$: length of profile chord
$c_m$: pitching moment
$\alpha$: angle of attack
$c_{mo}$: null moment coefficient
$c_{amax}$: maximum lift coefficient
$c_{wmin}$: minimum drag coefficient
S: center line
D: thickness distribution
$b_1$: first camber maximum of the center line S
$b_2$: second camber maximum of the center line S
$b_3$: camber minimum of center line S
1: wing profile
2: slot-flap profile
3: profile upper side (wing 1)
3': profile upper side (flap 2)
4: profile under side (wing 1)
4': profile under side (flap 2)
5: profile chord (wing 1)
5': profile chord (flap 2)
6: profile trailing edge (wing 1)
6': profile trailing edge (flap 2)
7: profile nose (wing 1)
7': profile nose (flap 2)
8: flap roof It will be obvious to those skilled in the art that many modifications may be made within the scope of the present invention without departing from the spirit thereof, and the invention includes all such modifications.

What we claim is:

1. A profile shape for wings of short take-off and landing aircraft, for cruising speeds up to about 700 km/h, which comprises a profile having a center line in combination with a nose radius to achieve the maximum possible lift as well as the least possible trimming drag for take-off or cruising, where the center line (S) includes a first forward point ($b_1$) at about $x/l=0.15$ with a first camber maximum of about 1.54% of the length (l), a rear point ($b_2$) at about $x/l=0.7$ with a second camber maximum which is about 1.94% of the length (l), a point ($b_3$) located between the points ($b_1$ and $b_2$) and at about $x/l=0.4$ representing a camber minimum of about 1.4% of the length (l), and where a profile droplet is superposed on the center line (S) and evinces a thickness distribution D having a forward point of about $y_D/l=0.059$ at about $x/l=0.15$, by a point $y_D/l=0.08$ at about $x/l=0.42$, a point of about $y_D/l=0.052$ at about $x/l=0.7$, and by a rear point of about $y_D/l=0.007$ at about $x/l=1.0$, and said profile also having a nose radius (r) of about $r/l=0.0145$.

2. A profile according to claim 1 including a high-lift flap (2) of the single-slot flap type mounted on the wing (1), said flap having a depth of about 30% of the depth of the wing (1), and a maximum rearward offset of the flap roof (8) of the order of about 90%.

* * * * *